(12) United States Patent
Roehr

(10) Patent No.: US 6,991,694 B2
(45) Date of Patent: Jan. 31, 2006

(54) TAILGATE MANUFACTURING PROCESS

(76) Inventor: Claus Peter Roehr, 4 Old Oak Dr. South, Palm Coast, FL (US) 32137

( * ) Notice: Subject to any disclaimer, the term of this patent is extended or adjusted under 35 U.S.C. 154(b) by 260 days.

(21) Appl. No.: 10/278,498

(22) Filed: Oct. 24, 2002

(65) Prior Publication Data

US 2003/0155066 A1  Aug. 21, 2003

Related U.S. Application Data

(60) Provisional application No. 60/357,718, filed on Feb. 19, 2002.

(51) Int. Cl.
*B29C 43/02* (2006.01)

(52) U.S. Cl. .............. 156/245; 156/242; 156/292; 156/297; 156/300; 264/257

(58) Field of Classification Search .......... 156/242, 156/245, 297, 300, 292; 264/241, 257–258, 264/248, 263, 319; 296/50–53, 55–56, 57.1, 296/58–62, 146.5, 146.8, 146.6, 901.01; 52/784.1, 790.1, 630; 49/501; 428/473.5, 428/474.4, 480, 500, 524; 442/286–294, 442/394–399

See application file for complete search history.

(56) References Cited

U.S. PATENT DOCUMENTS

| | | | | |
|---|---|---|---|---|
| 4,098,943 A | * | 7/1978 | Degginger et al. | 428/300.7 |
| 4,675,231 A | * | 6/1987 | Kia | 442/103 |
| 5,944,373 A | * | 8/1999 | Seksaria et al. | 296/57.1 |
| 6,471,279 B2 | * | 10/2002 | Pommeret | 296/57.1 |
| 6,672,642 B1 | * | 1/2004 | Seksaria et al. | 296/50 |
| 2004/0041429 A1 | * | 3/2004 | McLaren et al. | 296/57.1 |

* cited by examiner

*Primary Examiner*—Jessica Rossi
(74) *Attorney, Agent, or Firm*—William M. Hobby, III

(57) ABSTRACT

A method of making a tailgate for a pickup truck or the like includes selecting a pair of polymer sheets and selecting a flexible fiberglass woven mat and sandwiching the selected fiberglass woven mat between the selected pair of polymer sheets. The sandwiched mat polymer sheets are placed on a tailgate forming mold for molding the inner tailgate panel from the sandwiched matted polymer sheets. The inner tailgate panel has a plurality of spacing reinforcing ribs thereon. The outer tailgate panel is formed and the ribs on the inner tailgate panel have a cold setting adhesive applied thereto for binding the outer tailgate panel thereover to form a tailgate having inner and outer fiberglass reinforced polymer panels spaced and reinforced by a plurality of intersecting ribs. Once the inner and outer panels have been positioned, they are placed in a fixture to hold them while the adhesive cures.

8 Claims, 5 Drawing Sheets

TAILGATE MANUFACTURING PROCESS

This application claims the benefit of Provisional App. No. 60/357,718, filed Feb. 19, 2002.

BACKGROUND OF THE INVENTION

The present invention relates to a method of manufacturing a tailgate to a pickup truck and especially to a method of making a molded polymer tailgate.

Pickup trucks are among the most popular of vehicles sold in the United States. Each includes a cabin, a bed section for carrying cargo, and a swinging tailgate to retain cargo in the bed. The tailgate assembly is generally formed in a metal forming operation from stamped metal panels which are welded together to form the tailgate. The tailgate as presently used in pickup trucks is a relatively heavy assembly, weighing about 50 pounds. The assembly is made from a number of stamped steel sheets that are joined together by resistance spot welding. Steel reinforcements are welded to the sheets, adding strength and rigidity at critical locations.

The tailgate needs to be as light as possible for ease of use and so that the truck's payload can be increased without sacrificing fuel economy. Currently available tailgates are heavy because they are made from steel. In addition, they are assembled from many components and are not as reliable, strong, or durable as desired. The steel panels are also subject to attack by moisture, road salt, and other chemical agents in the environment that are corrosive to steel and eventually detract from its structural integrity and appearance. Accordingly, there still remains a need to provide a lightweight, strong, durable panel for pickup truck tailgates that has minimal impact upon vehicle cost. It is also desirable to reduce tailgate weight in order to improve fuel efficiency and truck payload capacity.

In recent years, some vehicle body panels have been made from thermoplastic polymers. Such panels are lighter than steel sometimes provide reduced strength and rigidity compared with steel panels. It has been generally assumed that tailgates needed to be made from steel to provide the durability and surface finish desired by today's consumers. Because the tailgate assembly is used as a loading platform when in the lowered position, it must be strong enough to support a substantial weight. Merely substituting plastic components for the steel inner and outer panels of existing tailgate designs do not provide sufficient strength to meet this load requirement.

Advances in materials, paints and molding techniques now enable the manufacture of a tailgate that meets the surface finish requirements of a vehicle exterior surface. The materials make a molded tailgate visually indistinguishable from a painted steel tailgate.

Accordingly, a method of making a molded polymer tailgate to a pickup truck is provided which reduces weight and costs without sacrificing strength.

SUMMARY OF THE INVENTION

A method of making a tailgate for a pickup truck or the like includes selecting a pair of polymer sheets and selecting a flexible fiberglass woven mat and sandwiching the selected fiberglass woven mat between the selected pair of polymer sheets. The sandwiched mat polymer sheets are placed on a tailgate forming mold for molding the inner tailgate panel from the sandwiched fiberglass mat and polymer sheets. The inner tailgate panel has a plurality of spaced reinforcing ribs on the inside thereon. The ribs on the inner tailgate panel have a cold setting adhesive applied thereto for binding the outer tailgate panel thereover to form a tailgate having inner and outer fiberglass reinforced polymer panels spaced and reinforced by a plurality of intersecting ribs. Once the inner and outer panels have been positioned, they are placed in a fixture to hold them while the adhesive cures.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
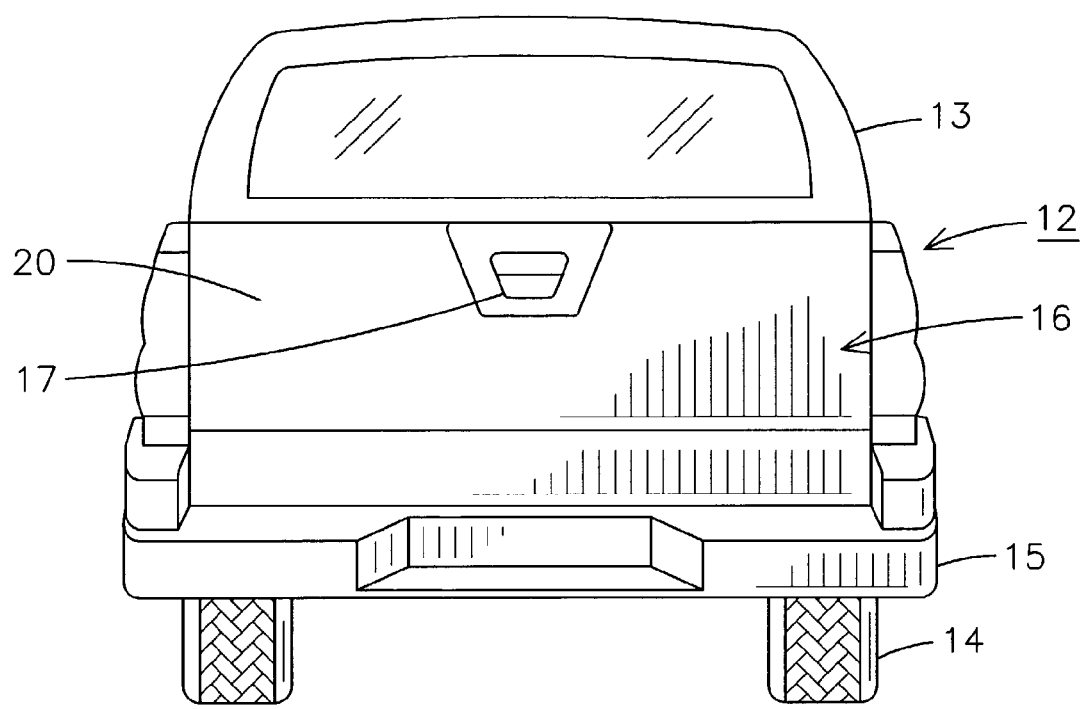
FIG. 1 shows the rear of a pickup truck having a gate in accordance with the present invention thereon.

Referring to FIG. 1 of the drawings, a pickup truck 12 has a cab 13 and tires 14 and a rear bumper 15 and includes a tailgate 16 in accordance with the present invention. The tailgate 16 may have a handle 17 for operating the tailgate locks for dropping the hinged tailgate.

Figure 2:
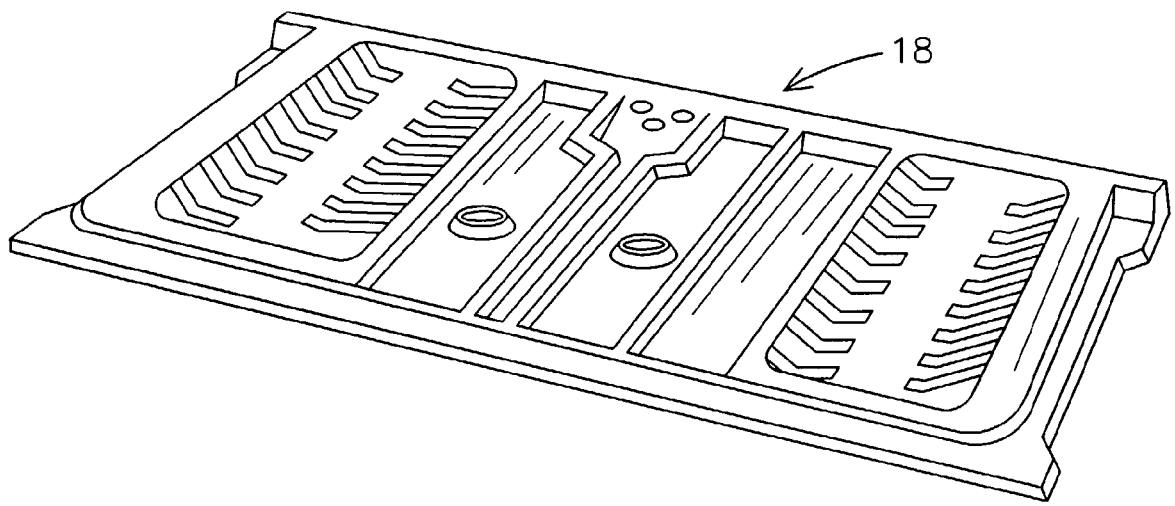
FIG. 2 is a perspective view of a molded inner tailgate panel.
Figure 3:
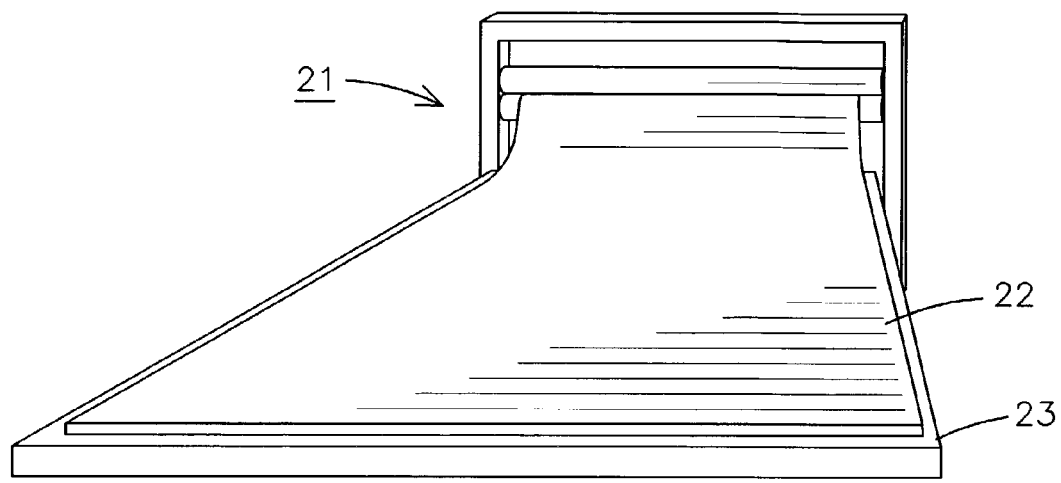
FIG. 3 is a perspective view of the polymer sheets being extruded.
Figure 4:
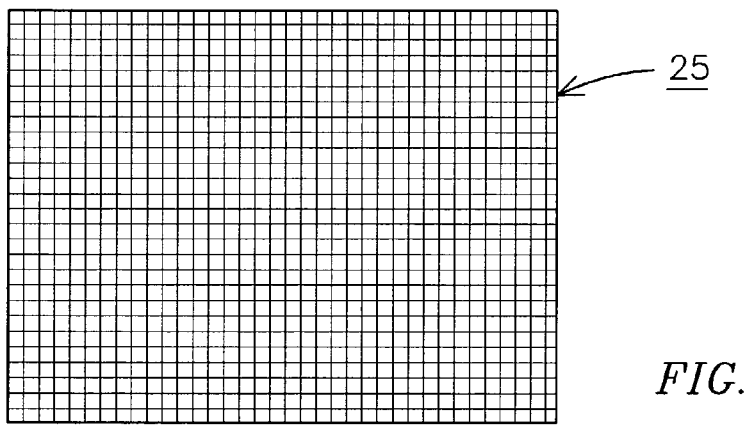
FIG. 4 is an elevation of a fiberglass mat.

The method of making the tailgate of FIG. 1 includes the making of an inner tailgate panel 18, as shown in FIG. 2, and the outer tailgate panel 20 out of a reinforced polymer sheet material of a predetermined color. In FIG. 3, a polymer extruding machine 21 is shown extruding a thin sheet of thermoplastic 22 onto a support table 23. FIG. 4 shows a woven fiberglass mat 25 which is a flexible mat commonly used in molding rigid fiberglass objects, such as boats, when incorporated into a resin to form a fiberglass epoxy type object.

Figure 5:
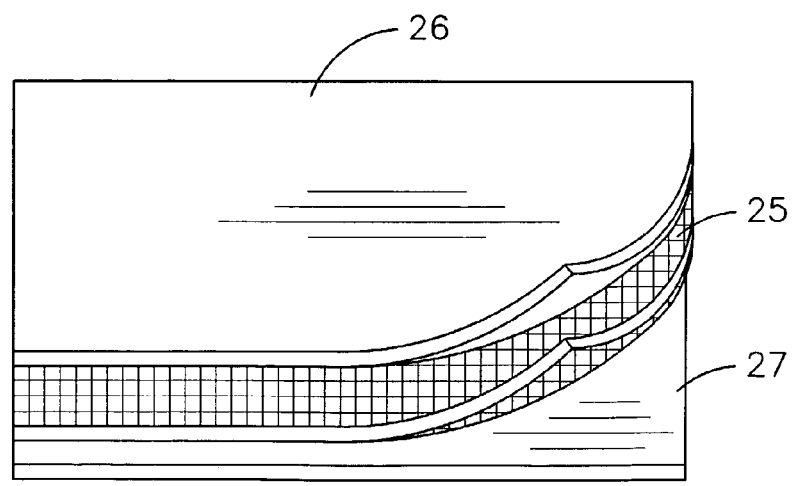
FIG. 5 is a perspective view of the sandwiched fiberglass mat between two sheets of polymer material.
Figure 6:
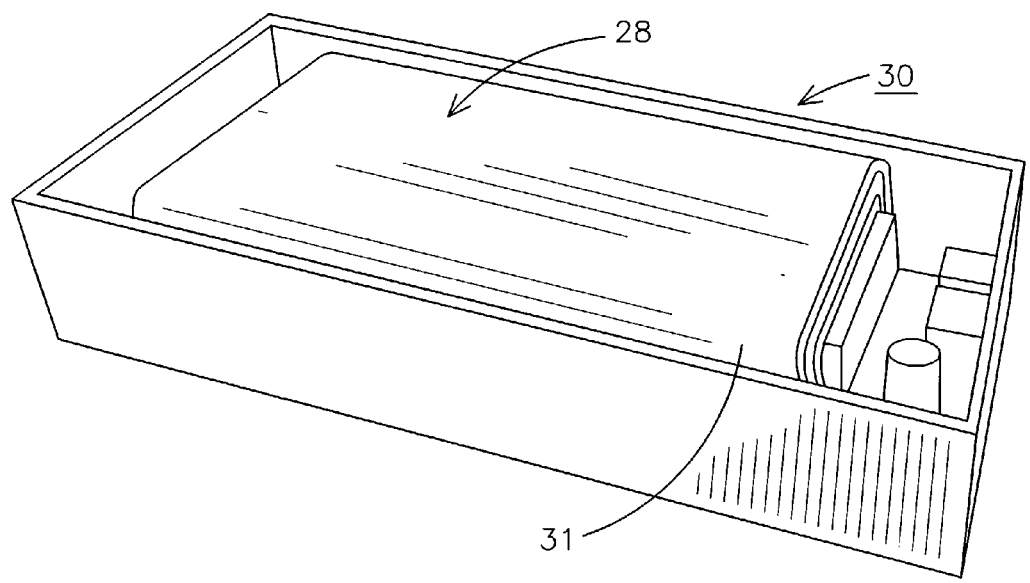
FIG. 6 is a perspective view placing the sandwiched fiberglass and polymer sheet into a tailgate forming mold.

In the present invention, both inner panel 18 and outer panel 20 use a pair of polymer sheets 26 and 27 extruded in FIG. 3, and having the flexible fiberglass woven mat 25 sandwiched therebetween as shown in FIG. 5. All items are flexible at this point. The sandwiched woven fiberglass mat 25, when sandwiched between the polymer sheets 26 and 27, forms a preformed sheet of material 28 which is placed within a compression mold 30 (for the inner tailgate panel 18) with the sides 31 of the plastic material 28 following the shape of the mold. The polymer sheets are made of a sheet molding compound (or SMC) which is a composite material consisting of chopped fiberglass dispersed randomly in a thermoset polymer matrix, most commonly a styrene cross-linked unsaturated polyester resin. The particular SMC used has between 50 and 60% fiberglass. The mold has the preformed intersecting ribs 33 and 34 placed therein FIRST before the material 28 is placed thereover so that the thermoplastic ribs are welded to the panel 18 as the panel is formed in the compression mold under the heat and pressure from the compression molding die. Thus, the panel 18 and ribs become one piece of panel. The ribs found on the SMC inner panel are machined into the core and cavity halves of the compression mold 30 to predetermined length, width and angularity requirements. The SMC compound flows into the cut ribs as the material liquifies upon closure of the mold. The material then cures and is formed into a rib feature of the panel. The compression mold applies a predetermined heat and pressure to the sandwiched material 28 to form the thermoplastic material into a single unit with the polymer material impregnating directly into the reinforcing fiberglass mat and with the ribs formed on the inner panel. The manufacturing parameters for this compression molded process with this thermoplastic material may be as follows:

Cavity temperatures of 155° C. +/−3° F.
Core temperatures of 149° C. +/−3° C.
Molding machine tonnages ranging from 800 tons to 1100 tons.
Closed time of mold 60–75 seconds.
Vacuum requirements of 17 to 20 inches.

Figure 7:
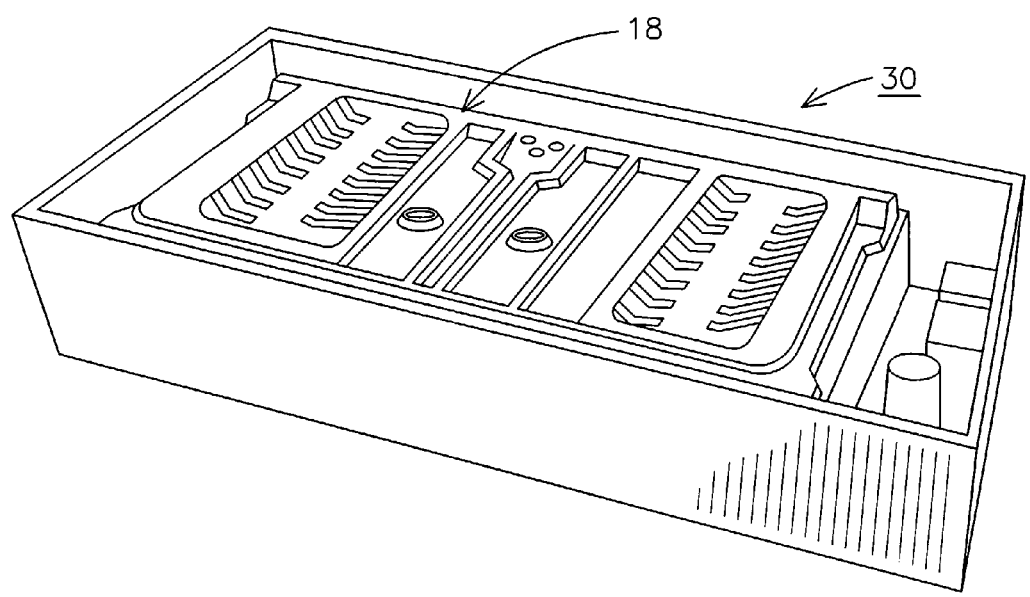
FIG. 7 has the inner tailgate assembly formed in the mold of FIG. 6.
Figure 8:
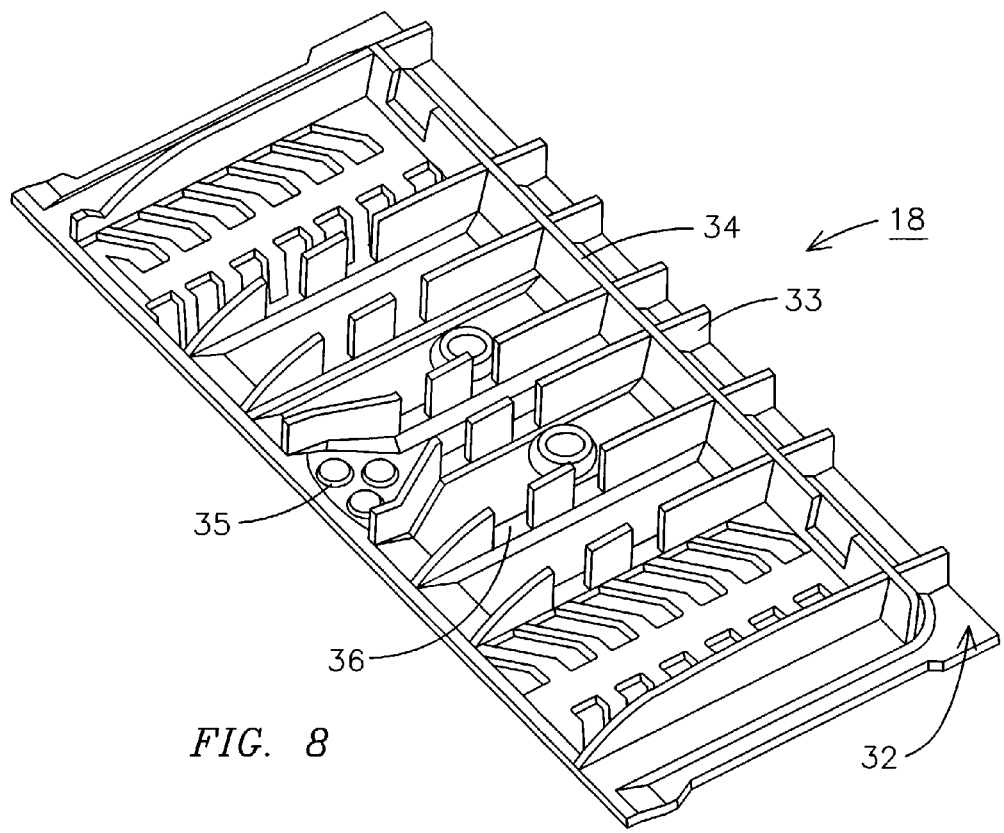
FIG. 8 is a perspective view of the inside of the inner tailgate.
Figure 9:
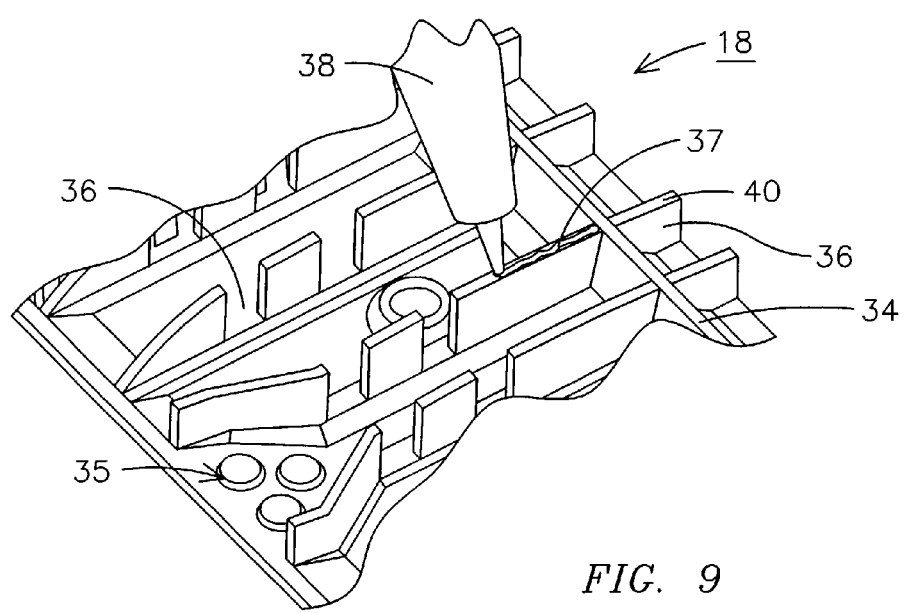
FIG. 9 is a perspective view of the adhesive being applied to the ribs of the inner tailgate panel of FIG. 8.
Figure 10:
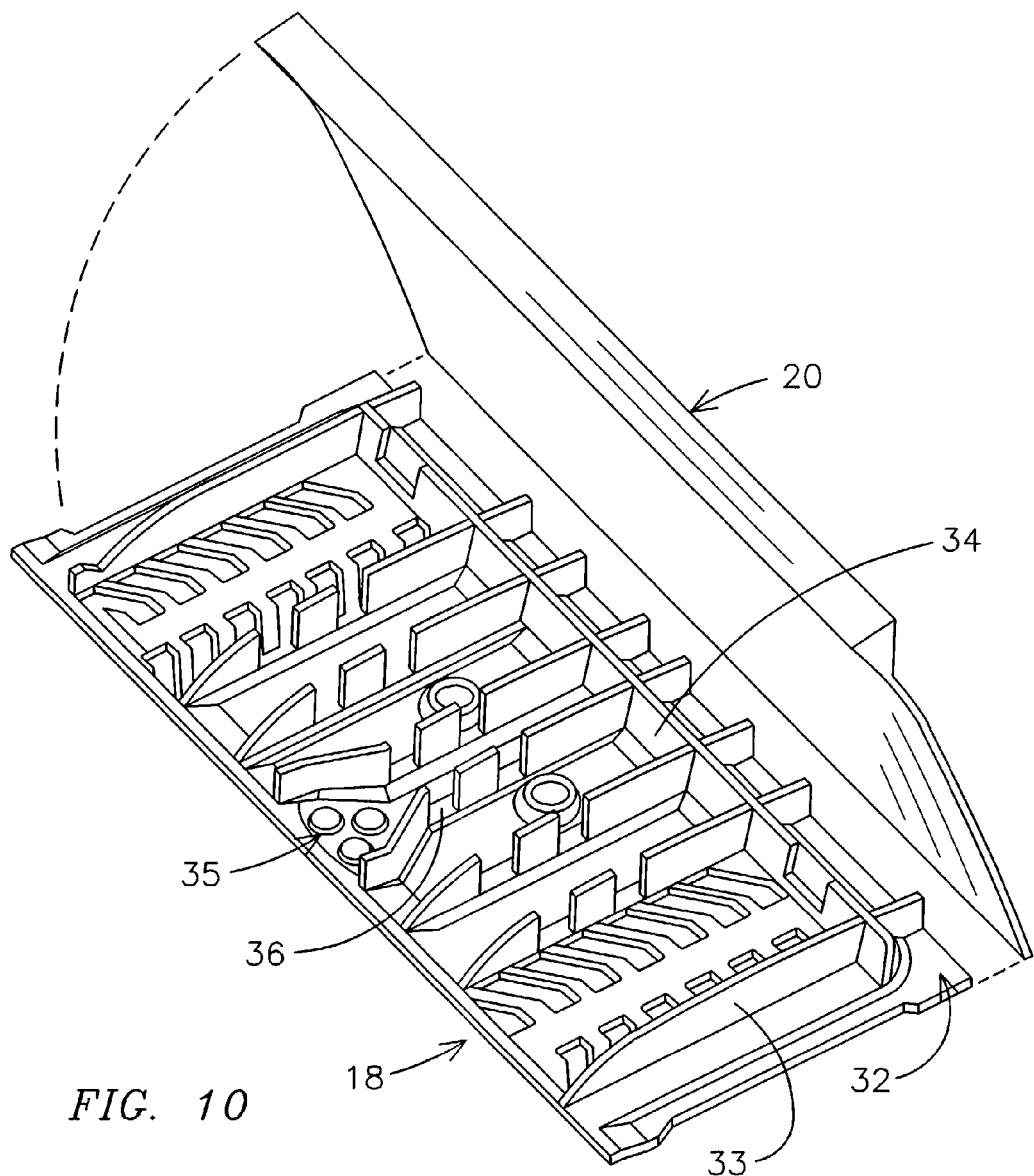
FIG. 10 is an exploded perspective view of the inner and outer tailgate panels being assembled.
Figure 11:
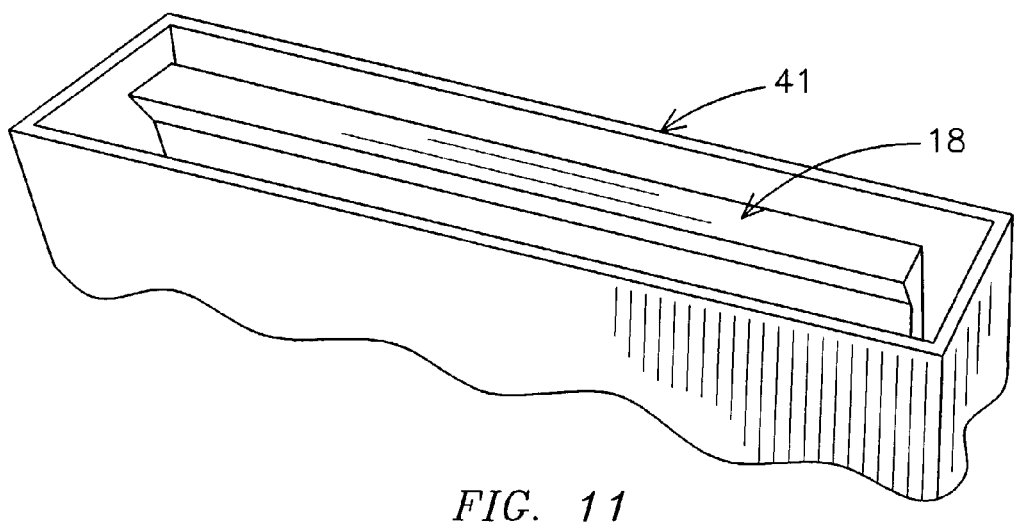
FIG. 11 is the tailgate assembly placed in a curing fixture during the curing of the adhesive.

The mold shapes the sandwiched material 28 into the inner panel 18 when compressed and heated between the mold sections, as shown in FIG. 7. The inner panel 18 inner side 32 has a plurality of shaped ribs 33 rigidly attached thereto with cross ribs 34 intersecting the ribs 33 to form a ribbed pattern for the inside of the tailgate 16. The inner tailgate panel 18 can be seen having a preformed handle attaching area 35 along with a plurality of openings 36 within the reinforcing spacing ribs 33. Once the inner panel 18 and outer panel 20 are formed, the inner panel has an adhesive 37 applied thereto with an adhesive gun 38 applying adhesive to the edges 40 of the vertical ribs 33 and the horizontal ribs 34. A cold bond adhesive is used and once the adhesive is applied, the outer panel 20 is applied over the adhesive and attached to the ribs 33 and 34. The adhesive is a fast curing, one component, polyurethane adhesive with high green strength. This adhesive relies on thermoplastic properties to achieve initial cure. Final cure is through atmospheric moisture. The adhesive also has a very high thixotropy. The entire tailgate can then be inserted into a fixture 41 to support the tailgate in a manner not to scratch or mar the panels while the adhesive 37 cures to form a tailgate panel. It should also be clear that in the making of the actual panels, the hinges and door handle can be added in appropriate steps of the process. The locking mechanisms are attached to the sides of the truck bed walls rather than directly to the polymer tailgate so as to avoid the greater forces applied to the tailgate when opening and closing the tailgate.

The use of two panels formed of high strength sandwiched polymer material with a woven fiberglass mat reinforcing which are bonded together in order to provide one structural unit produces a tailgate of greater strength than is normally obtained in a plastic object of this size. In addition the use of a cold bonding system for an automotive application with a cure time which might be no longer than ten minutes to bond the two panels together provides a greater strength adhesive manufacture over the standard hot bonding normally done between plastic components. Finally, the moving of the striker to the gate with the locking mechanisms on the side panels of the truck allows the polymer tailgate to reduce the complexity of raising and lowering the tailgate once attached to a pickup truck.

It should be clear at this time that a method of manufacturing a tailgate which is made of a polymer material in a monocoque structure in which the pair of panels are joined with a rib structure similar to the strength gained in a honeycomb structure in combination with panels sandwiched with fiberglass woven mats produce a lightweight yet strong tailgate capable of handling the forces needed in the operation of a tailgate on a pickup truck. However, the present invention should not be construed as limited to the forms shown which are to be considered illustrative rather than restrictive.

I claim:

1. A method of making a tailgate for a truck comprising the steps of:
    selecting a pair of polymer sheets;
    selecting a flexible fiberglass woven mat;
    sandwiching the selected fiberglass woven mat between the selected pair of polymer sheets;
    placing the sandwiched mat and polymer sheets into an inner tailgate panel forming mold;
    molding an inner tailgate panel from said sandwiched woven fiberglass mat and polymer sheets;
    forming an outer tailgate panel; and
    binding said inner and outer tailgate panels together with spacing and reinforcing ribs therebetween with an adhesive thereby forming a strong, lightweight polymer tailgate for a truck.

2. The method of making a tailgate for a truck in accordance with claim 1 in which the step of molding said inner panel includes molding a plurality of spacing ribs on the inside of said inner panel.

3. The method of making a tailgate for a truck in accordance with claim 2 in which the step of binding said inner and outer tailgate panels together includes applying an adhesive to said plurality of spacing ribs on said inner panel and placing an outer panel thereover.

4. The method of making a tailgate for a truck in accordance with claim 3 in which the step of applying adhesive to said plurality of spacing ribs includes applying a cold bonding cement to said ribs.

5. The method of making a tailgate for a truck in accordance with claim 4 in which the step of selecting a pair of polymer sheets includes selecting a pair of thermoplastic sheets.

6. The method of making a tailgate for a truck in accordance with claim 5 in which the step of selecting a pair of thermoplastic sheets includes selecting a styrene polyester resin having 50 to 60% fiberglass by volume therein.

7. The method of making a tailgate for a truck in accordance with claim 6 in which the step of applying an adhesive includes applying a polyurethane cold bonding adhesive.

8. The method of making a tailgate for a truck in accordance with claim 7 including the placing of said inner and outer panels and said applied adhesive into a cold forming jig for curing said adhesive to bind said inner and outer panels together.

* * * * *